(12) United States Patent
Smith et al.

(10) Patent No.: US 11,238,896 B2
(45) Date of Patent: Feb. 1, 2022

(54) PASSIVE RETRACTION OF A HUB CLAMP IN AN OPTICAL DISC DRIVE

(71) Applicant: INTERNATIONAL BUSINESS MACHINES CORPORATION, Armonk, NY (US)

(72) Inventors: Daniel Smith, Santa Cruz, CA (US); David Jame Altknecht, San Jose, CA (US); John Best, San Jose, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 242 days.

(21) Appl. No.: 16/273,982

(22) Filed: Feb. 12, 2019

(65) Prior Publication Data
US 2020/0258541 A1 Aug. 13, 2020

(51) Int. Cl.
*G11B 17/22* (2006.01)
*G11B 17/028* (2006.01)

(52) U.S. Cl.
CPC ........ *G11B 17/225* (2013.01); *G11B 17/0284* (2013.01); *G11B 17/0288* (2013.01)

(58) Field of Classification Search
CPC combination set(s) only.
See application file for complete search history.

(56) References Cited

U.S. PATENT DOCUMENTS

| 9,741,390 B1 | 8/2017 | Altknecht |
| 2003/0053401 A1 | 3/2003 | Ogasawara et al. |
| 2004/0139456 A1 | 7/2004 | Lin et al. |
| 2004/0268377 A1* | 12/2004 | Azai ............... G11B 17/0285 720/710 |
| 2008/0117726 A1* | 5/2008 | Yoshida ............ G11B 17/028 369/30.28 |
| 2010/0031278 A1* | 2/2010 | Ueno ............... G11B 17/0286 720/601 |
| 2010/0146525 A1 | 6/2010 | Kim et al. |
| 2010/0211965 A1* | 8/2010 | Kido ............... G11B 17/0284 720/706 |
| 2011/0258643 A1* | 10/2011 | Wehrenberg ....... G11B 17/0282 720/604 |
| 2011/0258649 A1 | 10/2011 | Wehrenberg |

FOREIGN PATENT DOCUMENTS

EP 0555486 A1 8/1992

OTHER PUBLICATIONS

Kim et al., "Optimal disk clamp design to minimize stress variation of disks in a hard disk drive", KSME & Springer 2009 (p. 2645).

* cited by examiner

*Primary Examiner* — Kyle O Logan
(74) *Attorney, Agent, or Firm* — Griffiths & Seaton PLLC

(57) ABSTRACT

Embodiments for passive retraction of a hub clamp in an optical disc drive. The optical disc drive may comprise a spindle hub coupled to an optical assembly. The optical disc drive may further include a disc clamp assembly configured to hold an optical disc on the spindle hub, the disc clamp assembly including a hub clamp partially comprised within a clamp carriage. The hub clamp of the optical disc drive may be biasedly drawn toward the spindle hub when in a first position and biasedly drawn toward the clamp carriage when in a second position. The bias may be generated by at least one ferromagnetic material integrated into the hub clamp and at least one ferromagnetic material integrated into the spindle hub.

15 Claims, 11 Drawing Sheets

… (US 11,238,896 B2)

PASSIVE RETRACTION OF A HUB CLAMP IN AN OPTICAL DISC DRIVE

BACKGROUND OF THE INVENTION

Field of the Invention

The present disclosure relates generally to computer readable storage devices. More particularly, the embodiments of the present disclosure relate to optical disc drives and methods of manufacturing optical disc drives having a mechanism for passive retraction of a hub clamp assembly therein, for improved loading and extraction of an optical disc.

Description of the Related Art

When loading or extracting (unloading) an optical disc from an optical disc drive, the optical disc is placed in communication with the optical disc drive (e.g., into a tray or slot) and the optical disc drive and/or a robotic loading mechanism situates the optical disc into a position proximal to a spindle hub of the optical disc drive. The spindle hub changes position to engage an aperture of the optical disc and changes the position of the disc in order to rotate the optical disc without contacting the optical disc loader. In some implementations, a high-performance optical storage system may be used which includes a plurality of discs in a disc library which are selected through the robotic loading mechanism. The robotic loading mechanism may comprise a disc retrieval unit (DRU) to move discs between storage locations and the optical disc drive(s) that read and write the data on the optical discs. This DRU must incorporate means to obtain the optical disc at a pickup location and release the optical disc at its destination location.

SUMMARY OF THE INVENTION

Various embodiments for passive retraction of hub clamp mechanisms in optical disc drives in disc storage systems. In one embodiment, an optical disc drive comprises a spindle hub coupled to an optical assembly; and a disc clamp assembly configured to hold an optical disc on the spindle hub, the disc clamp assembly including a hub clamp partially comprised within a clamp carriage. The hub clamp is biasedly drawn toward the spindle hub when in a first position and biasedly drawn toward the clamp carriage when in a second position.

The foregoing summary has been provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
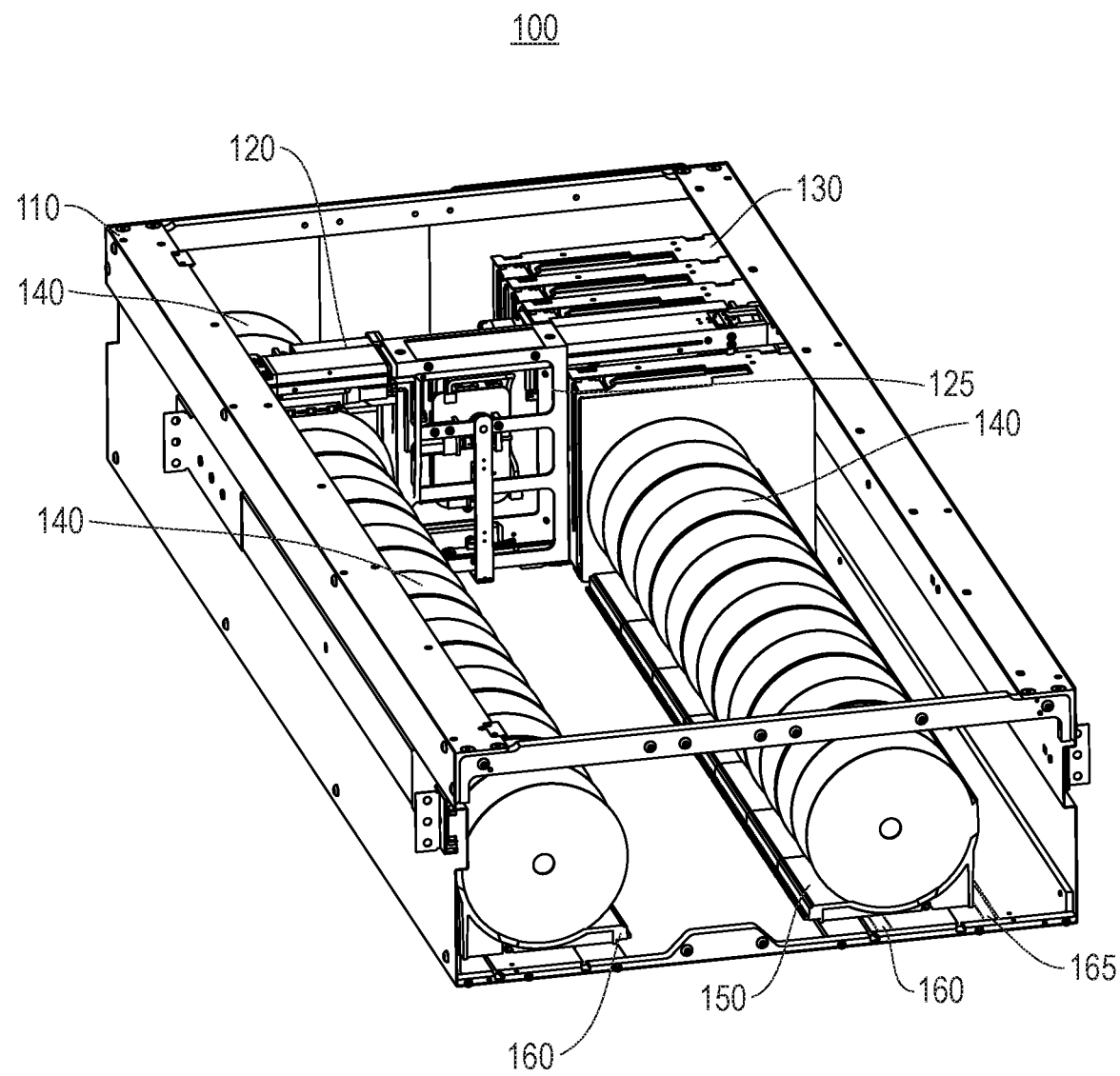
FIG. 1 is a perspective view of a high-performance optical storage system that may implement an optical disc drive, according to an embodiment of the present invention.

Reference in the description to "one embodiment" or "an embodiment" means that a particular feature, structure, or characteristic described in connection with the embodiment is included in at least one embodiment of the invention. The phrase "in one embodiment" located in various places in this description does not necessarily refer to the same embodiment.

In the following detailed description, for purposes of explanation, numerous specific details are set forth in order to provide a thorough understanding of the subject matter of the present application. It will be evident, however, to one skilled in the art that the disclosed embodiments, the claimed subject matter, and their equivalents may be practiced without these specific details.

The detailed description includes references to the accompanying drawings, which form a part of the detailed description. The drawings show illustrations in accordance with example embodiments. These embodiments, which may also be referred to herein as "examples," are described in enough detail to enable those skilled in the art to practice the embodiments of the claimed subject matter described herein. The embodiments may be combined, other embodiments may be utilized, or structural, logical, and electrical changes may be made without departing from the scope and spirit of the claimed subject matter. It should be understood that the embodiments described herein are not intended to limit the scope of the subject matter but rather to enable one skilled in the art to practice, make, and/or use the subject matter.

As previously mentioned, the present invention relates to the field of robotics in computer storage. Specifically, the present invention details mechanisms for improving the process of inserting and removing an optical disc from an optical disc drive in a high-performance optical storage system employing robotic means for loading and unloading optical discs. In the high-performance optical storage system described herein, a disc is inserted by a robotic actuator into a respective optical disc drive. Upon insertion by the robotic actuator, a standard optical disc drive uses a "floating" magnetic hub clamp to secure the optical disc to the motor (spindle) hub. However, this floating hub clamp is loosely constrained, and can touch the data surface of the optical disc during the load or unload operation. This inherently can scratch the data surface of the optical disc causing irreparable damage to data contained thereon.

Accordingly, the (floating) hub clamp of the present invention introduces additional securing means into the assembly containing the hub clamp, such that when the spindle hub and the hub clamp are separated (i.e., to load or unload an optical disc onto the spindle hub), the hub clamp retracts itself to a position that does not interfere with the disc operations. This retraction action is mechanically configured and passively implemented by the use of additional magnet(s) integrated into the hub clamp assembly, as will be further described.

Turning now to the figures, FIG. 1 illustrates a high-performance optical storage system 100 that may implement an optical disc drive 130, according to an embodiment. In one embodiment, the high-performance optical storage system 100 includes an enclosure 110, a moveable arm 120 connected to a disc retrieval unit (DRU) 125 that includes a disc gripper device 320 (FIG. 2), multiple optical disc drives 130, multiple optical disc-based media (discs) 140, disc cassettes 150, and tracks 160 and 165 that hold the disc cassettes 150 in place. In one embodiment, the enclosure 110 provides a stable platform and protection from the environment. In one embodiment, the enclosure may be sized as a typical 19-inch rack mounted device with rack mounting connectors. Depending on the space and enclosure size chosen, the enclosure 110 may have a greater capacity of optical disc drives 130, disc cassettes 150, and thus, discs 140. In one example, the disc cassettes 150 are placed within the enclosure 110 on either side (e.g., left and right sides) of the enclosure 110. In one example, additional disc cassettes 150 and discs 140 space is available adjacent the optical disc drives 130. In wider enclosures 110, more optical disc drives 130 may be positioned adjacent each other on the left and right side of the enclosure 110 when more available space for optical disc drives 130 is available. In one embodiment, the moveable arm 120 moves using motors and gears on tracks within the enclosure 110 to move the arm 120 from the back of the enclosure 110 to the front of the enclosure 110. The DRU 125 is moveable to either side of the enclosure 110 to retrieve a disc 140 using the disc gripper device 320 for placement in an optical disc drive 130 or for replacement back to a disc cassette 150. In other embodiments, other configurations of stored discs 140 and the DRU 125 may be used for employment of the optical disc drive 130.

In one embodiment, the disc gripper device 320 includes a pair of jaw devices that are shaped to contact only a thin sector close to the edge of a storage disc 140, and slide towards or away from each other. The jaw devices are driven closer together by calipers on the outer surfaces of the jaw devices.

Figure 2:
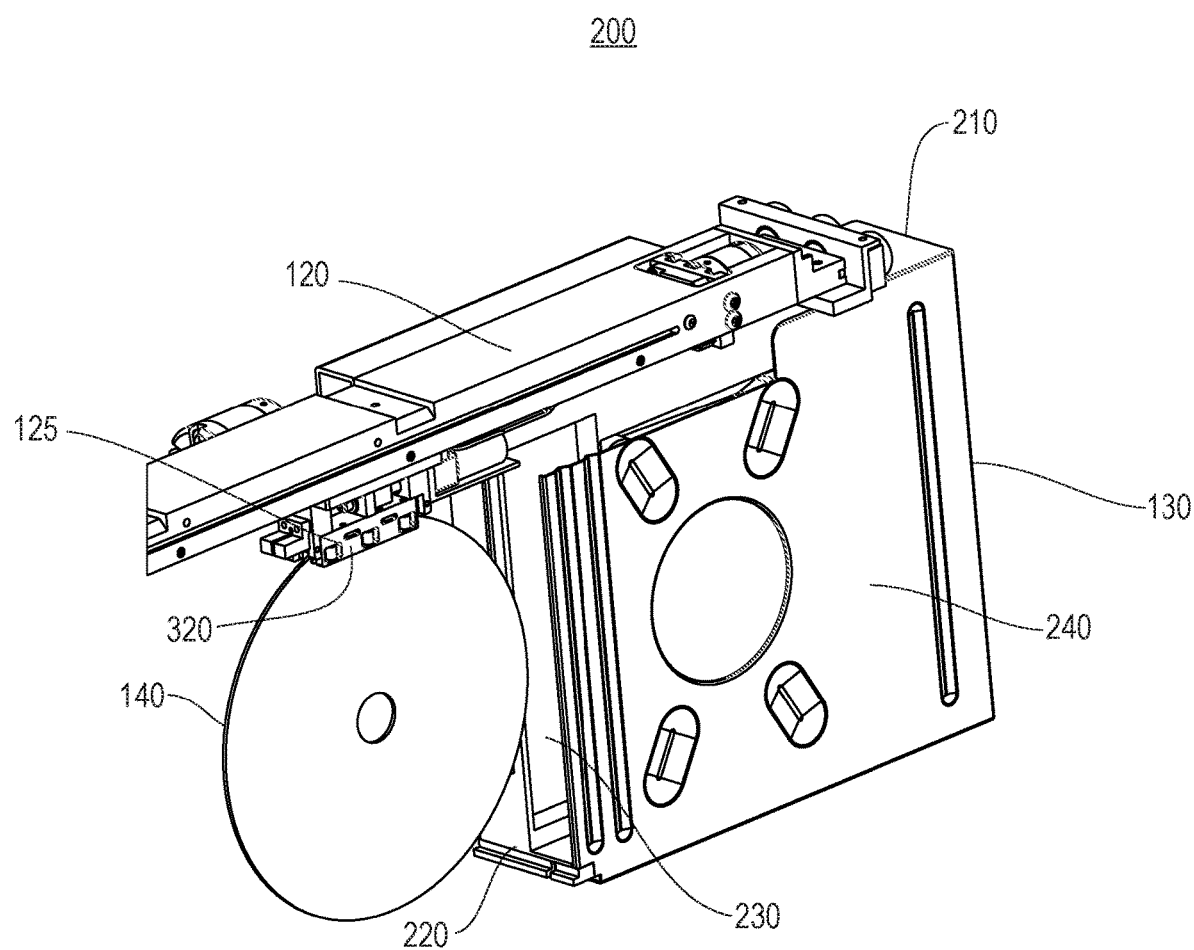
FIG. 2 is a perspective view of a disc retrieval unit (DRU) holding an optical disc and aligned in front of the optical disc drive, according to an embodiment of the present invention.
Figure 3:
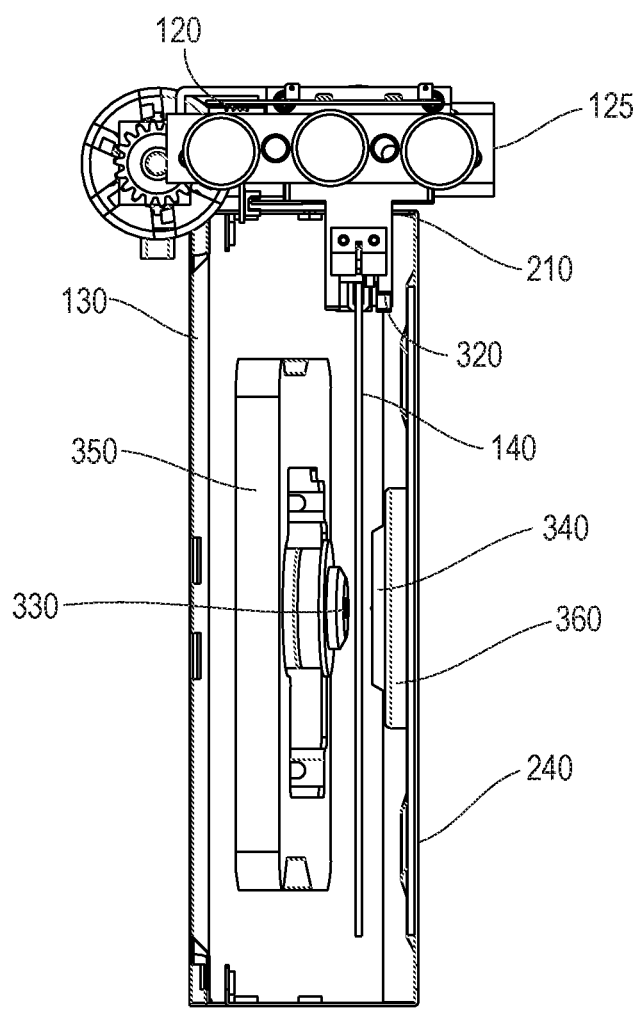
FIG. 3 is a front side view of the optical disc drive, according to an embodiment of the present invention.

FIG. 2 illustrates a perspective view 200 of a DRU 125 holding a disc 140 with a disc gripper device 320 and aligned in front of the optical disc drive 130, according to an embodiment. In one example, the DRU 125 is moved in the high-performance optical storage system 100 (FIG. 1) such that the disc 140 is centered at the optical disc drive 130 spindle hub 330 (FIG. 3). The optical drive 130 is enclosed by a drive enclosure 240 and includes a top side 210, a front side 220, a contiguous opening 230 for accepting the disc 140. In one embodiment, the contiguous opening is formed on at least two adjacent sides (e.g., the top side 210 and the front side 220) and intersects a corner of the optical disc drive 130 in a plane of a disc 140 mount or disc 140 load position in the optical disc drive 130. In one example, the contiguous opening 230 may be considered as a front opening on the front side 220 and a top opening on the top side 210.

FIG. 3 shows a front side view 300 of the optical disc drive 130 of FIG. 2 with a DRU 125, according to an embodiment. The front side view 300 shows the axis along which the disc 140 travels from the disc gripper device 320 to enter and exit the optical disc drive 130. The DRU 125 includes the disc gripper device 320 that actuates to grip a disc 140 for picking up and dropping off a disc from one position (e.g., a disc cassette 150) in the high-performance optical storage system 100 (FIG. 1) to or from a particular optical disc drive 130. In one embodiment, the optical drive 130 includes (at a particular side of the disc 140) a disc clamp assembly 360 which contains the hub clamp (device/mechanism) 340 configured to "float" within the disc clamp assembly 360. At an opposite side (of the disc 140), the optical drive 130 may further include the spindle hub 330 and optical drive assembly 350 (i.e., inner components for reading/writing data from/to a disc 140). The hub clamp 340 within the disc clamp assembly 360 holds an optical disc 140 on the spindle hub 330.

In one embodiment, the disc clamp assembly 360 of the optical disc drive 130 may be located at a fixed position (with the hub clamp 340 comprised/floating therein) within the drive enclosure 240, and the spindle hub 330 and optical drive assembly 350 may be a moving mechanism to engage the disc 140 and clamp mechanism. In another embodiment, the disc clamp assembly 360 and the hub clamp 340 comprised therein is moveable to engage a fixed spindle 330 and optical drive assembly 350. In yet another embodiment, both the disc clamp assembly 360 and the hub clamp 340 comprised therein, and the spindle 330 and optical drive assembly 350 are moveable to engage a disc 140. One advantage of the embodiments over the typical systems is that the optical disc drive 130 enables the use of a compact robotic mechanism (e.g., DRU 125) that requires only two actively controlled degrees of freedom to transport discs 140 between a disc cassette 150 (FIG. 1) and the optical disc drive 130, and does not extend significantly above the height of a vertically oriented optical disc drive 130. It should be noted that the optical disc drive 130 (when implemented outside of optical storage system 100 (i.e., as a standalone device)) may be configured to operate in any physical orientation within three-dimensional space.

Figure 4A:
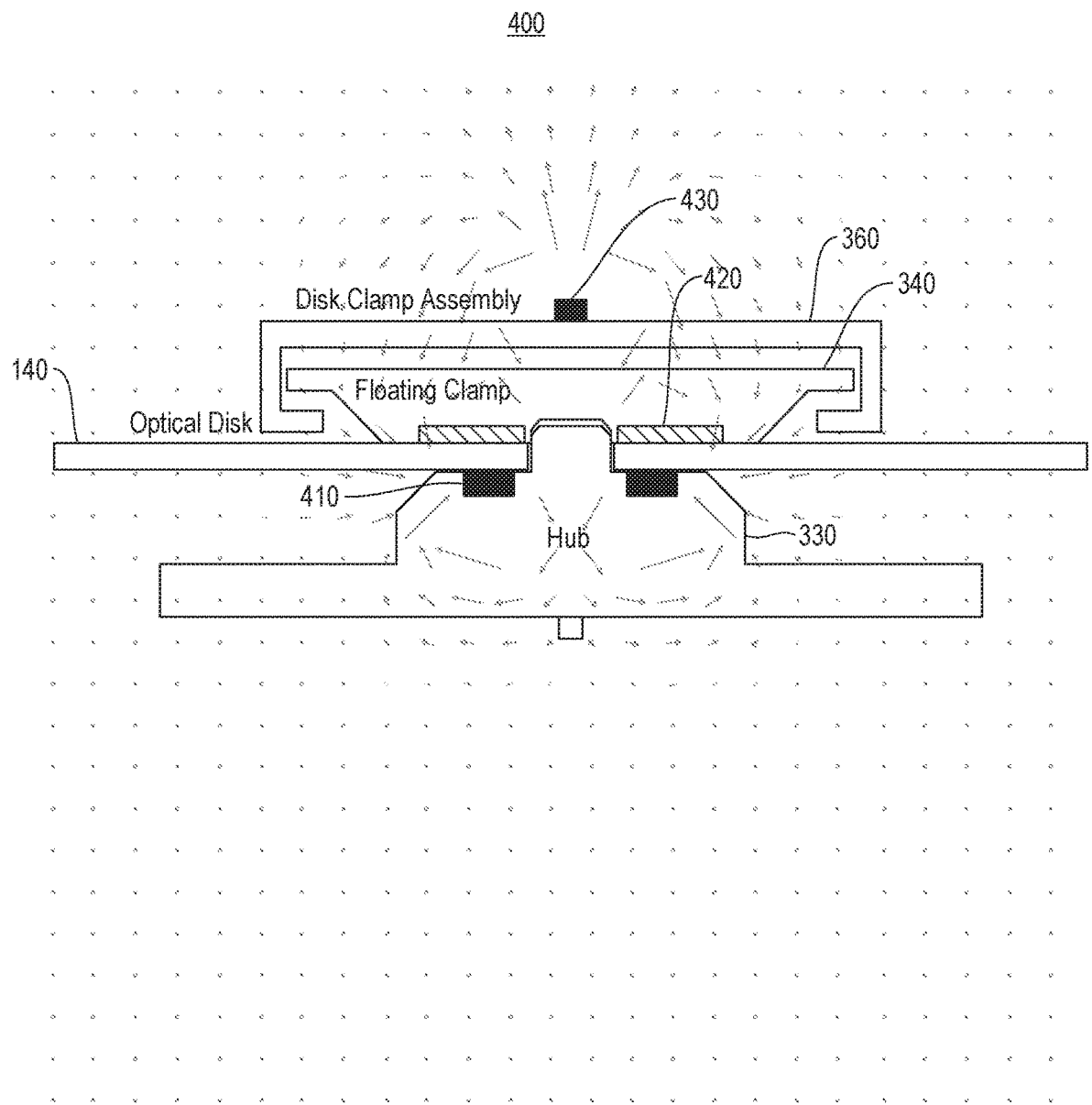
FIGS. 4A-4F are sectioned schematic views of a disc clamp assembly within the optical disc drive, according to an embodiment of the present invention.

Continuing, FIGS. 4A-4F depict sectioned schematic views of internal components including the disc clamp assembly 360 within the optical disc drive 130. Referring now to Fig. 4A, a side view of a diagram 400 is illustrated of a magnetic field simulation of the disc clamp assembly 360 with the hub clamp 340 positioned at a first height above the spindle hub 330. As shown in diagram 400, the disc 140 is inserted into the optical disc drive 130 and positioned on the spindle hub 330 to read the disc 140 by the components of the optical drive assembly 350 (not shown in FIGS. 4A-4F). When the disc 140 is positioned between the spindle hub 330 and the hub clamp 340, the actuator of the spindle hub 330 engages toward the disc clamp assembly 360 to substantially contact and hold the disc 140 in position between the spindle hub 330 and the hub clamp 340 (as depicted in diagram 400). As previously discussed, the hub clamp 340 is comprised within, yet is allowed to partially protrude from an aperture opening of the disc clamp assembly 360, such that the hub clamp 340 "floats" within the disc clamp assembly 360 and is therefore movable vertically and/or laterally within the disc clamp assembly 360.

The spindle hub 330 may have integrated therein, at a portion most proximal to a disc contacting surface thereof, one or more permanent magnets 410 to generate a magnetic field as illustrated in diagram 400 by the directional arrows. These permanent magnets 410 may be comprised of any hard ferromagnetic substance generally known in the art to generate a persistent magnetic field, such as iron, nickel, cobalt, alnico, ferrite, etc. The permanent magnets 410 interact with a second magnetic field generated from one or more soft ferro materials 420 which are integrated into a disc contacting surface of the disc clamp assembly 360 (i.e., the disc contacting portion of the hub clamp 340 which protrudes from the aperture of the disc clamp assembly 360) to biasedly draw the hub clamp 340 toward (through the aperture) the spindle hub 330, as the spindle hub 330 (within the optical drive assembly 350) moves toward the disc clamp assembly to clasp the disc 140. The soft ferro materials 420 may also be comprised of any soft ferromagnetic substance generally known in the art which are able to be magnetized when paired with a hard ferromagnetic substance, such as annealed iron, etc. It should be noted that the "disc contacting surface/portion" in this instance is intended to refer to a surface or portion of the respective component which directly or indirectly contacts the disc 140.

In some embodiments, on an outer surface of a side opposite the spindle hub 330 of the disc clamp assembly 360 (i.e., a side furthest away from the spindle hub 330 and/or a side opposite the disc contacting portion, as shown in diagram 400), one or more "retracting" permanent magnets 430 may additionally be integrated. These permanent magnets may be substantially comprised of equivalent materials to that of permanent magnets 410, or may be comprised of (or physically sized) different than permanent magnets 410. As illustrated in diagram 400, the permanent magnets 410 and the soft ferro materials 420 together form a strong magnetic field to tightly clasp the disc 140 between the hub clamp 340 and the spindle hub 330 as the optical drive assembly 350 reads the disc 140. In this configuration, the disc 140, spindle hub 330, and hub clamp 340 form a rigid structure.

Figure 4B:
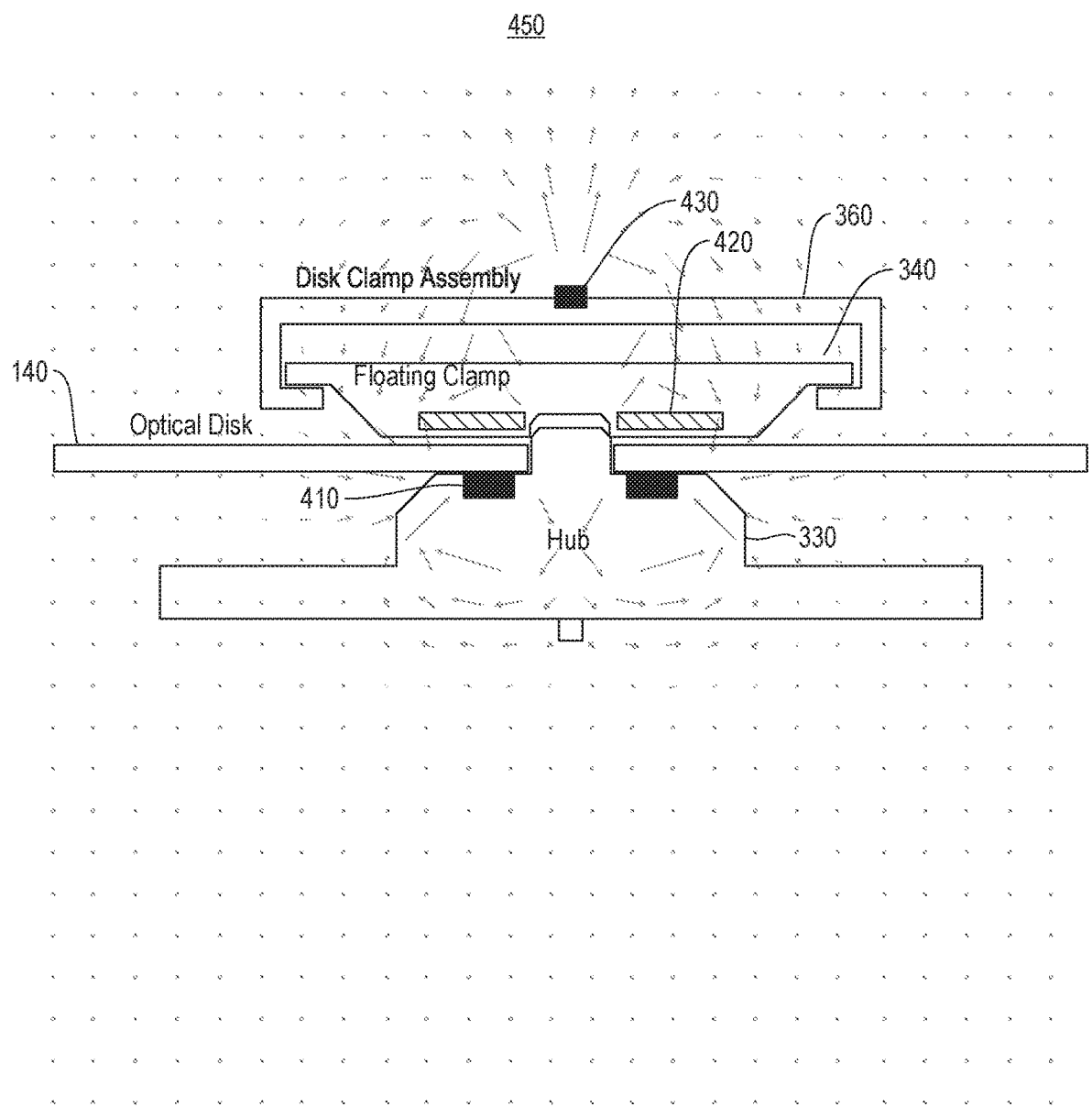

Referring now FIG. 4B, a diagram 450 is illustrated of a magnetic field simulation of the disc clamp assembly 360 with the hub clamp 340 positioned at a second height above the spindle hub 330. As shown by the directional arrows of the magnetic simulation in diagram 450, the magnetic field generated by the permanent magnets 410 of the spindle hub 330 and the soft ferro materials 420 of the hub clamp 340 begins to weaken as the spindle hub 330 is mechanically driven away from the disc clamp assembly 360 (i.e., as a drive unloading operation begins to occur).

Figure 4C:
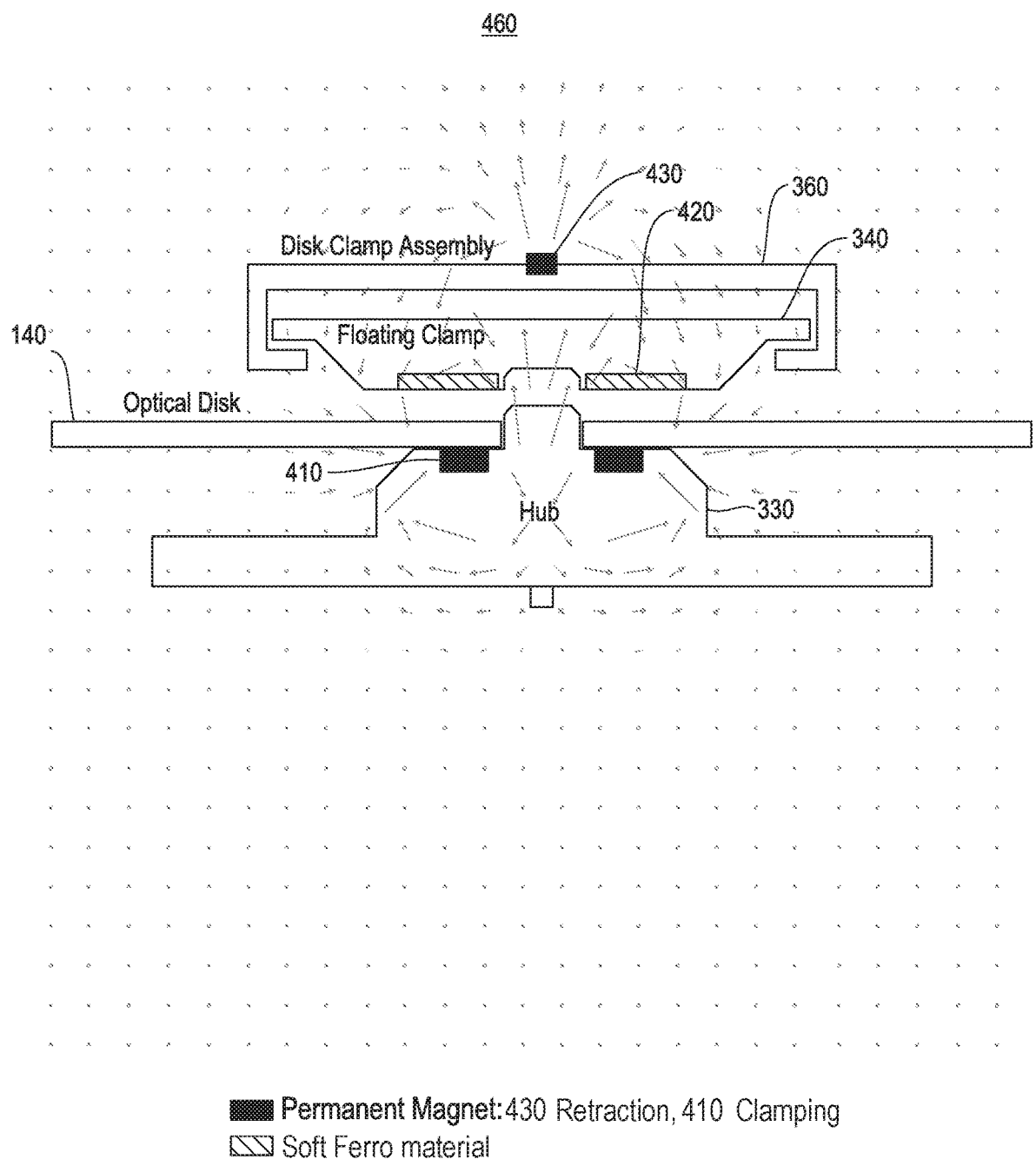

Referring now FIG. 4C, a diagram 460 is illustrated of a magnetic field simulation of the disc clamp assembly 360 with the hub clamp 340 positioned a third height above the spindle hub 330. Again, as shown by the directional arrows of the magnetic simulation in diagram 460, the magnetic field generated by the permanent magnets 410 of the spindle hub 330 and the soft ferro materials 420 of the hub clamp 340 continues to weaken as the spindle hub 330 is mechanically further driven away from the disc clamp assembly 360 (i.e., as the drive unloading operation continues).

Figure 4D:
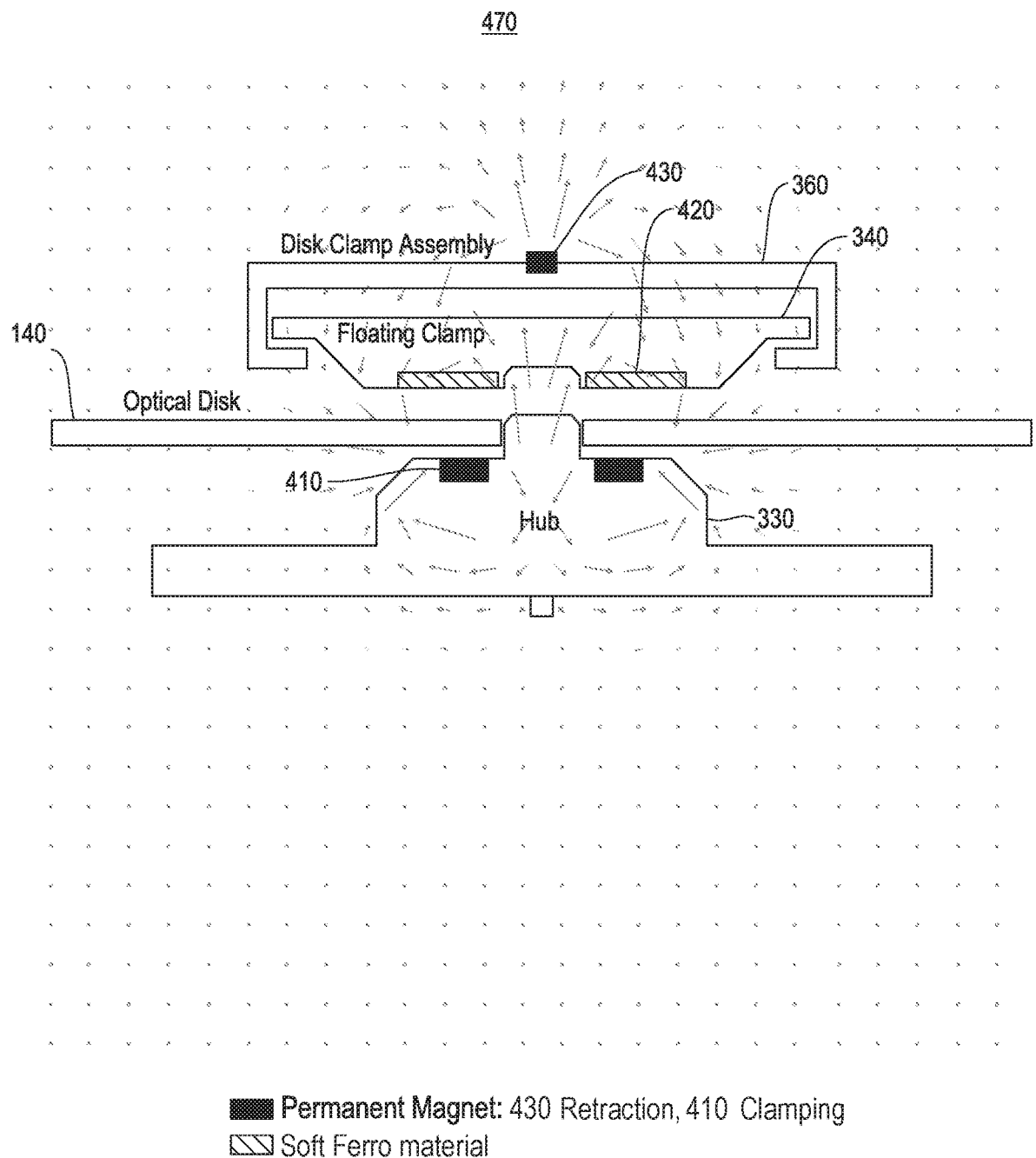

Referring now FIG. 4D, a diagram 470 is illustrated of a magnetic field simulation of the disc clamp assembly 360 with the hub clamp 340 positioned at a fourth height above the spindle hub 330. Again, as shown by the directional arrows of the magnetic simulation in diagram 470, the magnetic field generated by the permanent magnets 410 of the spindle hub 330 and the soft ferro materials 420 of the hub clamp 340 continues to weaken as the spindle hub 330 is mechanically further driven away from the disc clamp assembly 360. In diagram 470, it should be noted that the disc 140 begins to release from the spindle hub 330 as the drive unloading operation continues to occur.

Figure 4E:
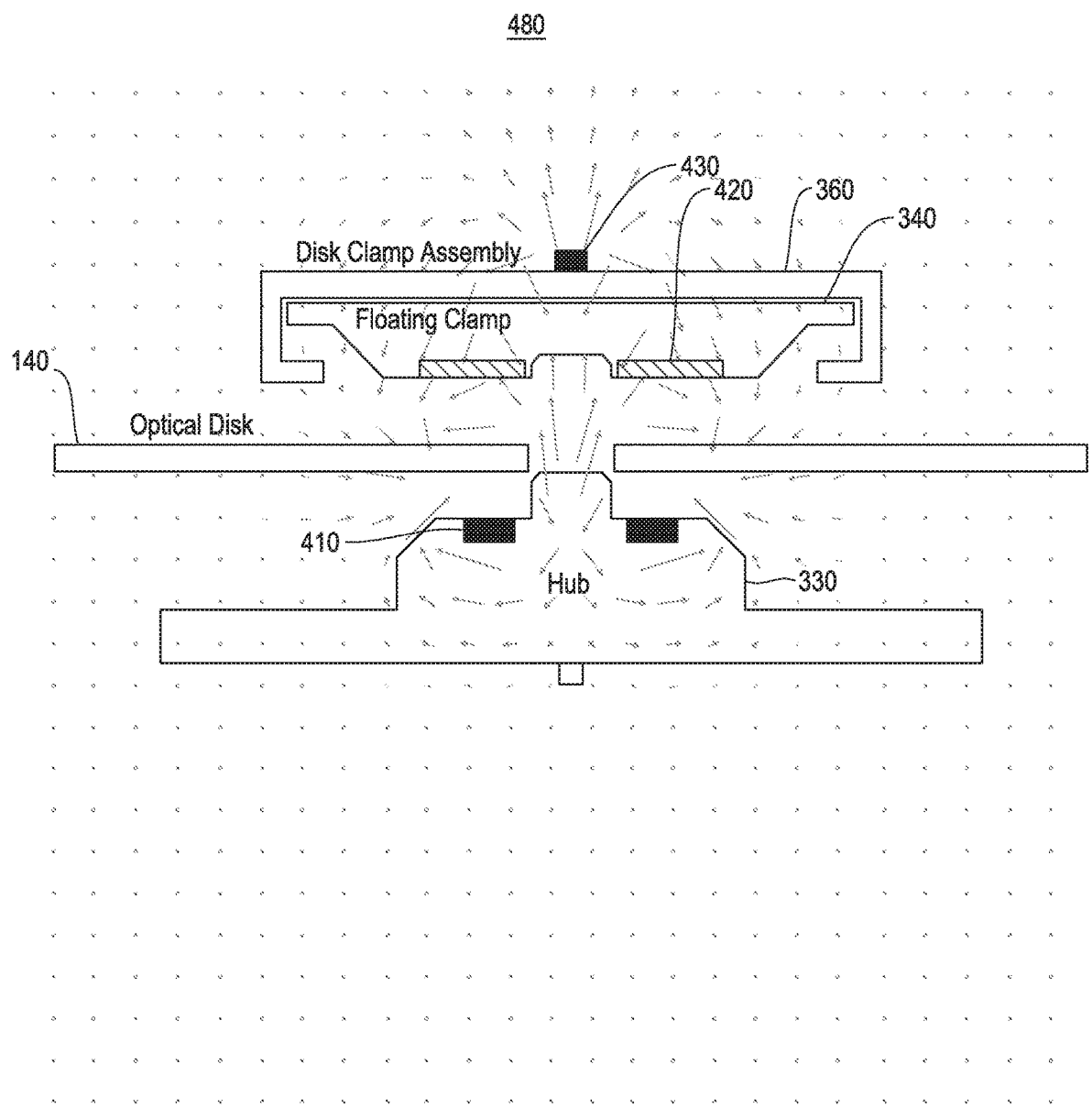

Referring now FIG. 4E, a diagram 480 is illustrated of a magnetic field simulation of the disc clamp assembly 360 with the hub clamp 340 positioned at a fifth height above the spindle hub 330. At this stage, as shown by the directional arrows of the magnetic simulation in diagram 480, the magnetic field generated by the permanent magnets 410 of the spindle hub 330 and the soft ferro materials 420 of the hub clamp 340 is at its weakest point as the spindle hub 330 is mechanically further driven away from the disc clamp assembly 360. Once the magnetic field generated by the permanent magnets 410 of the spindle hub 330 and the soft ferro materials 420 of the hub clamp 340 is at this weakest point, the second magnetic field produced by the retracting permanent magnet 430 attracting the soft ferro materials 420 (and/or other magnetic or metal portions) of the hub clamp 340 begins to overcome the bias of the first magnetic field generated by the permanent magnets 410 to passively (and mechanically) draw the hub clamp 340 against the opposite portion (the surface/side furthest away from the disc 140) of the disc clamp assembly 360. Upon completely overcoming the bias of the first magnetic field generated by the permanent magnets 410, the hub clamp 340 is drawn up into the disc clamp assembly 360 and away from the optical disc 140 as it is ejected from the disc drive 130. It should be noted that the term "passive" used herein denotes a default mechanical action that is not actuated (e.g., electronically or otherwise). Again, in diagram 480, it should further be noted that the disc 140 continues to release from the spindle hub 330 as the drive unloading operation occurs.

Figure 4F:
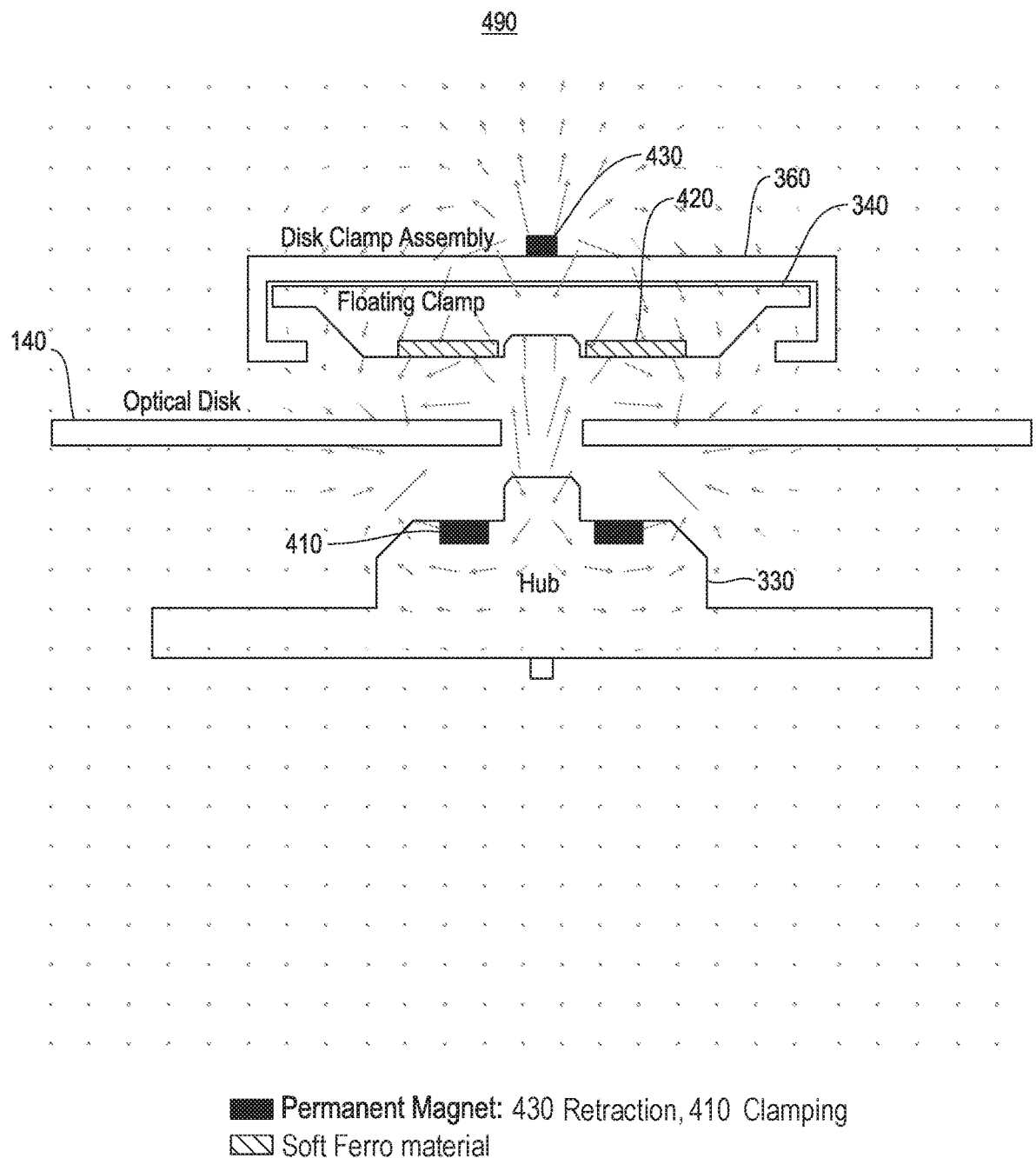

Referring now FIG. 4F, a diagram 490 is illustrated of a magnetic field simulation of the disc clamp assembly 360 with the hub clamp 340 positioned at a sixth height above the spindle hub 330. At this stage, as shown by the directional arrows of the magnetic simulation in diagram 480, the second magnetic field produced by the retracting permanent magnet 430 attracting the soft ferro materials 420 (and/or other magnetic or metal portions) of the hub clamp 340 completely overcomes the bias of the first magnetic field generated by the permanent magnets 410 to passively (and mechanically) draw the hub clamp 340 against the opposite portion (the surface/side furthest away from the disc 140) of the disc clamp assembly 360. As illustrated in diagram 490, the disc contacting surface of the hub clamp 340 is now substantially flush with an inner (proximal to the disc 140) surface of the disc clamp assembly 360 such that the disc contacting surface no longer protrudes from the aperture of the disc clamp assembly 360. When the hub clamp 340 is drawn to be tightly constrained within the disc clamp assembly 360 and the spindle hub 330 has been mechanically retracted fully, the disc 140 may then be safely removed from the disc drive 130 by mitigating any component contact with either side of the disc 140.

Figure 5:
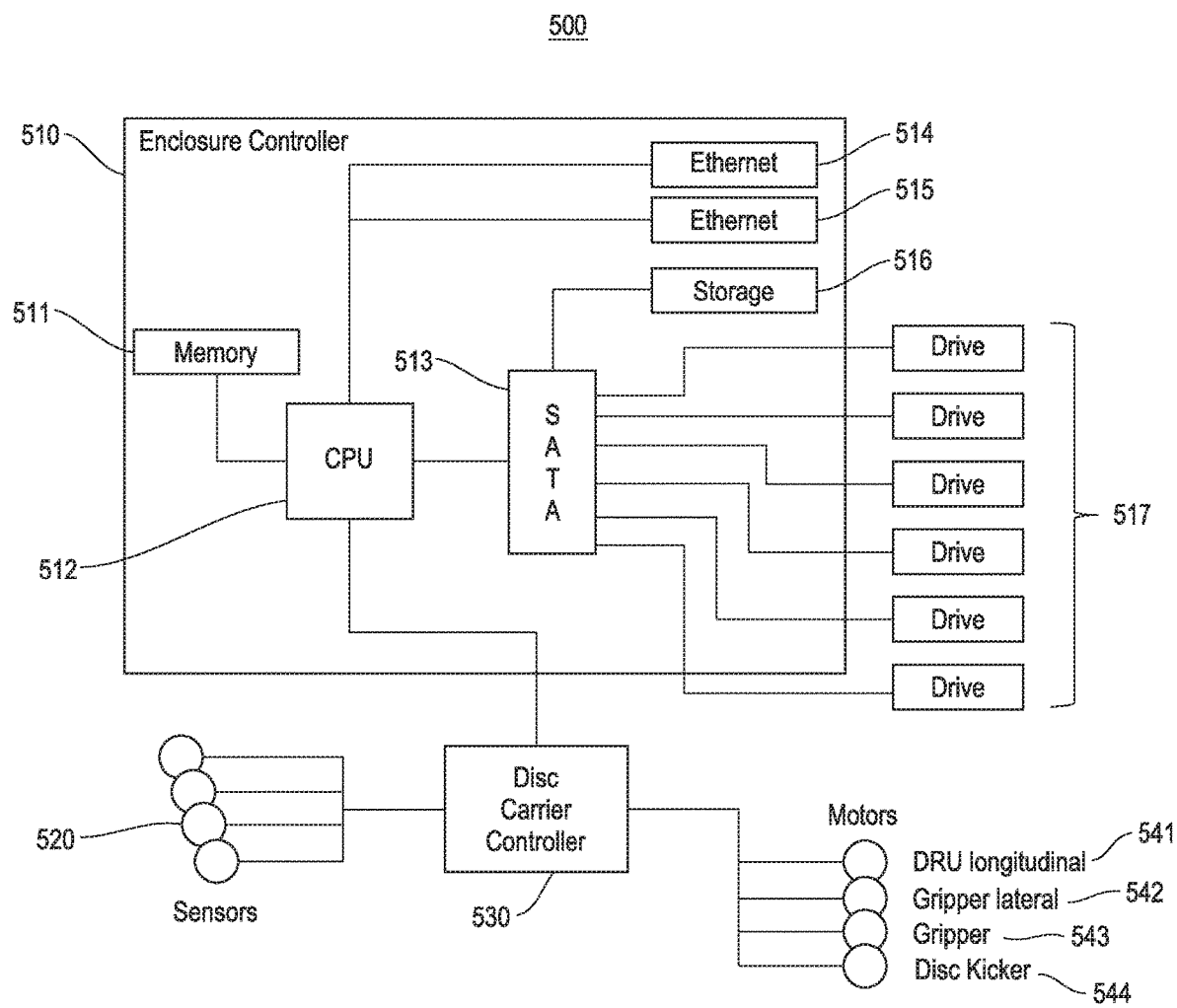
FIG. 5 is a block diagram of control circuitry and electronics that may be implemented in the optical storage system, according to an embodiment of the present invention.

FIG. 5 illustrates control circuitry and electronics 500 that may be implemented for the optical disc drive 130 of the high-performance optical storage system 100 of FIG. 1. In one embodiment, optical sensors of the sensor set 520 are used in the system to provide contactless position information for various moving components. In one example, optical sensors of the sensor set 820 on the arm 120 combined with the features of the disc cassettes 150 and the optical disc drives 130 allow the disc gripper device 320 to be positioned to within +-0.1 mm. Other sensors of the sensor set 520 are used to sense whether a disc (e.g., optical disc 140) is in the disc gripper device 320, the lateral position of the disc gripper device 320, etc. Sensors of the sensor set 520 may be used in concert with features on the disc cassettes 150 to facilitate positioning of the DRU 125 at disc locations. Other examples include referring to the discs 140 themselves. Similarly, features may be disposed on the enclosure 110 or the optical disc drive 130 to facilitate accurate positioning of the DRU 125 when loading and unloading discs 140 from the optical disc drives 130. In another example, transmissive photo interrupter sensors may be utilized for position state sensing of the various components. The motors used in the system may be of the brushless DC type, optionally with shaft encoders to aid in position determination. In one example, the motors may include the DRU 125 longitudinal motor(s) 541, the disc gripper device 320 lateral motor(s) 542, the disc gripper device 320 motor 543, the disc kicker device motor(s) 544, etc.

In one embodiment, the control electronics shown in the control circuitry and electronics 500 are partitioned into a robotic controller (the disc carrier controller 530) on the disc carrier and an enclosure controller 510 otherwise mounted in the enclosure 110 (FIG. 1). The latter does not move, and includes a CPU 512, memory 511 and associated components for running the control software. In one example the control circuitry and electronics 500 includes local storage for holding the operating system and the control software, although in another example may instead boot over a network and load the necessary software, or even boot off the optical media of a disc. In another example, flash memory storage is implemented. The enclosure controller 510 includes both the external interface to a host system or network as well as interfaces (SATA 513, storage interface 516) to the optical disc drives 130, collectively shown as a set 517. In one example, the external interface may include a network interface, such as Ethernet connections 514, 515. In one embodiment, for enhanced reliability, the network interface would include two connections, such as Ethernet connections 514 and 515 with each directed to a separate network switch system.

In another example, a third external interface might be used for system control and monitoring. In one embodiment, the enclosure controller 510 is responsive to commands over the external interface to load a disc 140 (FIG. 1) from disc cassette 150 into optical drive 130, read and write data, and return the disc 140 to the disc cassette 150. In one example, the enclosure controller 510 communicates with the robotic controller (disc carrier controller 530) to send commands, such as to load a selected disc 140 in a selected optical disc drive 130. The enclosure controller 510 also includes a data buffer for holding read and write data during data transfers.

In one embodiment, the robotic controller (disc carrier controller 530) manages the robotic activities of the high-performance optical storage system 100 (FIG. 1), including controlling the motors, reading optical and other sensor data and communicating state information with the enclosure controller 510. In one embodiment, the robotic controller (disc carrier controller 530) communicates with the enclosure controller 510 over a serial interface. The interface may be wired, such as universal serial bus (USB) over a flex cable, or wireless, such as infrared data association (IRDA), BLUETOOTH®, etc. In one example, on initialization, it is critical for the disc carrier controller 530 to determine the physical state of the high-performance optical storage system 100 to prevent damage. If the high-performance optical storage system 100 has undergone a controlled shutdown, this state information may be recorded within the library. Even so, this shutdown state needs to be confirmed. The high-performance optical storage system 100 may have been powered down in an unknown state, such as by an unintended power loss. For example, before the DRU 125 can move longitudinally, the high-performance optical storage system 100 must determine if a disc 140 is in the disc gripper device 320 and if so, position the disc gripper device 320 within the drive carrier prior to a longitudinal move. In one embodiment, the sensors set 520 includes sensors to detect if the disc gripper device 320 is centered, or to the left or right of center. Thus, the disc gripper device 320 can be moved directly to the center position. Similarly, sensors of the sensor set 520 are provided to determine if the disc kicker device is centered, or to the left or right of center. Once both disc gripper device 320 and disc kicker device are centered, the DRU 125 may be moved longitudinally. All these functions are accomplished through means of the set of sensors 520. In one embodiment, optical sensors are used to make the position determinations.

In one embodiment, the high-performance optical storage system 100 (FIG. 1) determines if discs 140 are located within any of the optical disc drives 130. The optical disc drives 130 may be queried to see if a disc 140 is loaded and the spindle hub 330 of an optical disc drive 130 is clamped by the hub clamp 340. It is possible for a disc 140 to remain in an optical disc drive 130 but not be clamped by the spindle hub 330. This can be tested by attempting a clamp operation.

Figure 6:
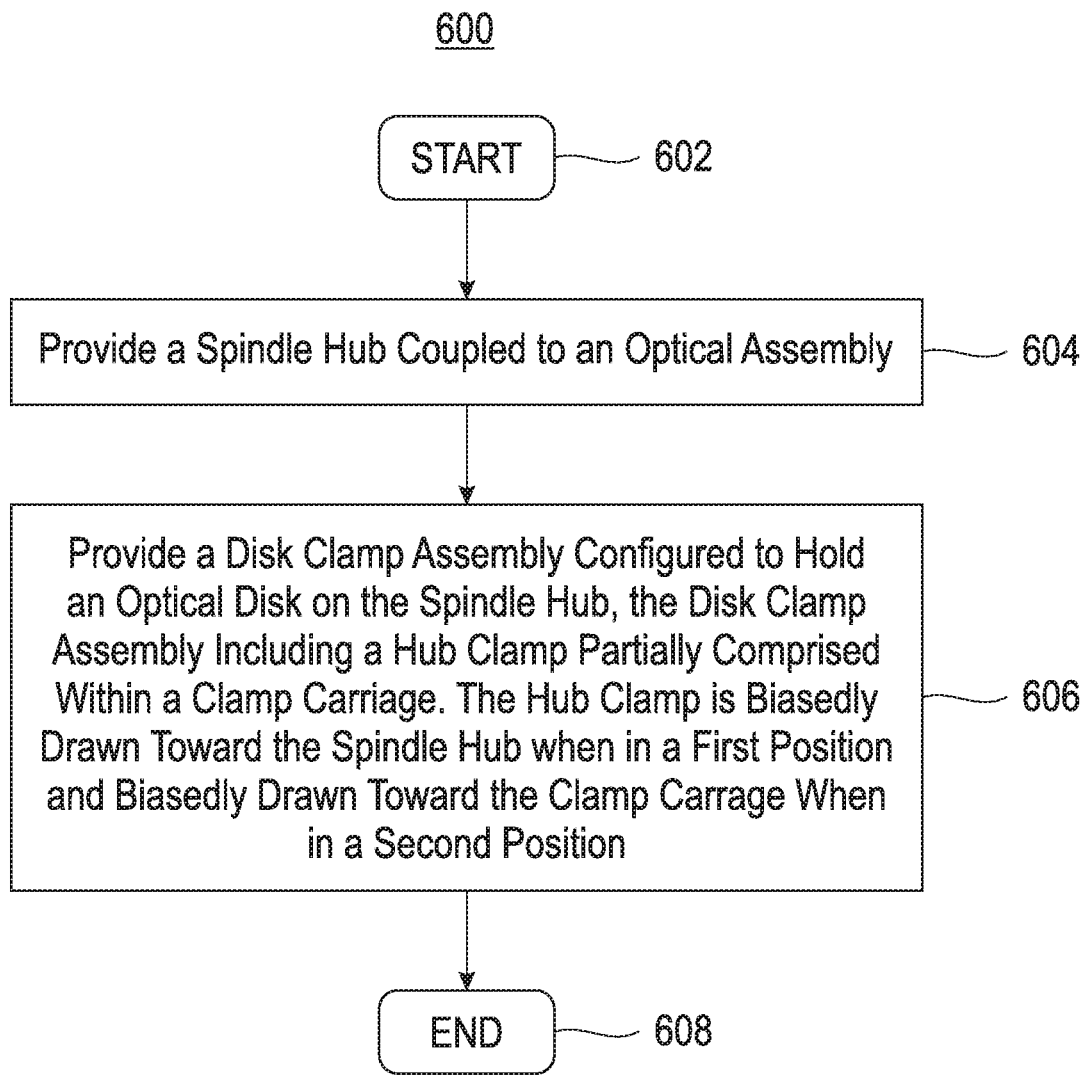
FIG. 6 is a flow chart diagram illustrating a method for manufacturing the optical disc drive, according to an embodiment of the present invention.

Concluding, FIG. 6 is a flow chart diagram illustrating a method 600 for manufacturing the optical disc drive 130, in accordance with aspects of the present invention. The method 600 begins (step 602) by providing a spindle hub coupled to an optical assembly (step 604). A disc clamp assembly is provided which is configured to hold an optical disc on the spindle hub, the disc clamp assembly including a hub clamp partially comprised within a clamp carriage. The hub clamp is configured to be biasedly drawn toward the spindle hub when in a first position and biasedly drawn toward the clamp carriage when in a second position (step 606). The method 600 ends (step 608).

In conjunction with the method 600 (and the optical disc drive 130), the disc clamp assembly is in a fixed position and the hub clamp floats vertically and laterally within the clamp carriage of the disc clamp assembly.

In conjunction with the method 600 (and the optical disc drive 130), at least one first magnet integrated into an outer portion of the clamp carriage is provided, the outer portion opposite the spindle hub.

In conjunction with the method 600 (and the optical disc drive 130), at least one second, induced magnet (i.e., a ferro magnetic material which induces a magnetic field when positioned nearby other magnetic materials) integrated into an inner portion of the hub clamp is provided, the inner portion proximal to the spindle hub.

In conjunction with the method 600 (and the optical disc drive 130), at least one third magnet integrated into the spindle hub proximal to the inner portion of the hub clamp is provided. It should be noted that the third magnet integrated into the spindle hub may comprise one magnet of an annular shape or may comprise multiple magnets integrated into the spindle hub in an annular configuration.

In conjunction with the method 600 (and the optical disc drive 130), when in the first position, the spindle hub is mechanically driven toward the disc clamp assembly such that the second and third magnets are passively drawn toward one another via a first magnetic field to clasp the optical disc positioned between the spindle hub and the hub clamp.

In conjunction with the method 600 (and the optical disc drive 130), when in the second position, the spindle hub is mechanically retracted away from the disc clamp assembly and the hub clamp is passively drawn toward the clamp carriage by the first magnet such that, as the spindle hub is mechanically retracted away from the disc clamp assembly, a second magnetic field of the first magnet overcomes the bias of the first magnetic field of the second and third magnets to draw the hub clamp toward the outer side of the clamp carriage.

In conjunction with the method 600 (and the optical disc drive 130), the first, second, and third magnets each respectively comprise one from a group consisting of a permanent ferromagnetic material and a soft ferromagnetic material.

In conjunction with the method 600 (and the optical disc drive 130), the optical disc drive is arranged to operate in any physical orientation within three-dimensional space.

The present invention may be an apparatus, system, a method, and/or a computer program product. That is, portions of the described invention (or functionality related thereto) may be implemented within the context of an apparatus, such as an IC, or within the context of a computer application controlling those portions of the described invention. The computer program product may include a computer readable storage medium (or media) having computer readable program instructions thereon for causing a processor to carry out aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of apparatus', systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. An optical disc drive, comprising:
   a spindle hub coupled to an optical assembly;
   a clamp carriage having at least one first magnet integrated therein at a position on a member opposite the spindle hub; and
   a disc clamp assembly configured to hold an optical disc on the spindle hub, the disc clamp assembly including a hub clamp partially comprised within the clamp carriage;
   wherein the hub clamp includes at least one second, induced magnet integrated into an inner portion thereof proximal to the spindle hub; and wherein the hub clamp is biasedly drawn toward the spindle hub by the at least one second, induced magnet drawing toward at least one third magnet integrated into the spindle hub proximal to the inner portion of the hub clamp when in a first position, and biasedly drawn toward the clamp carriage by the at least one second magnet drawing toward the at least one first magnet when in a second position.

2. The optical disc drive of claim 1, wherein the disc clamp assembly is in a fixed position and the hub clamp moves freely within the clamp carriage of the disc clamp assembly.

3. The optical disc drive of claim 1, wherein:
   when in the first position, the spindle hub is mechanically driven toward the disc clamp assembly such that the second and third magnets are passively drawn toward one another via a first magnetic field to clasp the optical disc positioned between the spindle hub and the hub clamp; and
   when in the second position, the spindle hub is mechanically retracted away from the disc clamp assembly and the hub clamp is passively drawn toward the clamp carriage by the first magnet such that, as the spindle hub is mechanically retracted away from the disc clamp assembly, a second magnetic field of the first magnet overcomes the bias of the first magnetic field of the second and third magnets to draw the hub clamp toward the outer side of the clamp carriage.

4. The optical disc drive of claim 1, wherein the first, second, and third magnets each respectively comprise one from a group consisting of a permanent ferromagnetic material and a soft ferromagnetic material.

5. The optical disc drive of claim 1, wherein the optical disc drive is arranged to operate in any physical orientation within three-dimensional space.

6. An optical disc drive, comprising:
   an enclosure assembly;
   a spindle hub coupled to an optical assembly comprised within the enclosure assembly;

a clamp carriage having at least one first magnet integrated therein at a position on a member opposite the spindle hub; and a disc clamp assembly comprised within the enclosure assembly and configured to hold an optical disc on the spindle hub, the disc clamp assembly including a hub clamp partially comprised within the clamp carriage, wherein the hub clamp includes at least one second, induced magnet integrated into an inner portion thereof proximal to the spindle hub; wherein:

when in a first position, the hub clamp is biasedly drawn toward the spindle hub by the at least one second, induced magnet drawing toward at least one third magnet integrated into the spindle hub proximal to the inner portion of the hub clamp such that at least a disc contacting portion of the hub clamp protrudes from an aperture of the clamp carriage toward the spindle hub; and when in a second position, the hub clamp is biasedly drawn toward the clamp carriage by the at least one second magnet drawing toward the at least one first magnet such that the disc contacting portion of the hub clamp is substantially flush with the aperture of the clamp carriage, wherein the hub clamp is biasedly drawn between the first position and the second position.

7. The optical disc drive of claim 6, wherein the disc clamp assembly is in a fixed position and the hub clamp moves freely within the clamp carriage of the disc clamp assembly.

8. The optical disc drive of claim 6, wherein:

when in the first position, the spindle hub is mechanically driven toward the disc clamp assembly such that the second and third magnets are passively drawn toward one another via a first magnetic field to clasp the optical disc positioned between the spindle hub and the hub clamp; and when in the second position, the spindle hub is mechanically retracted away from the disc clamp assembly and the hub clamp is passively drawn toward the clamp carriage by the first magnet such that, as the spindle hub is mechanically retracted away from the disc clamp assembly, a second magnetic field of the first magnet overcomes the bias of the first magnetic field of the second and third magnets to draw the hub clamp toward the outer side of the clamp carriage.

9. The optical disc drive of claim 6, wherein the first, second, and third magnets each respectively comprise one from a group consisting of a permanent ferromagnetic material and a soft ferromagnetic material.

10. The optical disc drive of claim 6, wherein the optical disc drive is arranged to operate in any physical orientation within three-dimensional space.

11. A method of manufacturing an optical disc drive, comprising:

providing a spindle hub coupled to an optical assembly;

providing a clamp carriage having at least one first magnet integrated therein at a position on a member opposite the spindle hub; and providing a disc clamp assembly configured to hold an optical disc on the spindle hub, the disc clamp assembly including a hub clamp partially comprised within the clamp carriage; wherein the hub clamp includes at least one second, induced magnet integrated into an inner portion thereof; and wherein the hub clamp is biasedly drawn toward the spindle hub by the at least one second, induced magnet drawing toward at least one third magnet integrated into the spindle hub proximal to the inner portion of the hub clamp when in a first position, and biasedly drawn toward the clamp carriage by the at least one second magnet drawing toward the at least one first magnet when in a second position.

12. The method of claim 11, wherein the disc clamp assembly is in a fixed position and the hub clamp moves freely within the clamp carriage of the disc clamp assembly.

13. The method of claim 11, wherein:

when in the first position, the spindle hub is mechanically driven toward the disc clamp assembly such that the second and third magnets are passively drawn toward one another via a first magnetic field to clasp the optical disc positioned between the spindle hub and the hub clamp; and when in the second position, the spindle hub is mechanically retracted away from the disc clamp assembly and the hub clamp is passively drawn toward the clamp carriage by the first magnet such that, as the spindle hub is mechanically retracted away from the disc clamp assembly, a second magnetic field of the first magnet overcomes the bias of the first magnetic field of the second and third magnets to draw the hub clamp toward the outer side of the clamp carriage.

14. The method of claim 11, wherein the first, second, and third magnets each respectively comprise one from a group consisting of a permanent ferromagnetic material and a soft ferromagnetic material.

15. The method of claim 11, wherein the optical disc drive is arranged to operate in any physical orientation within three-dimensional space.

\* \* \* \* \*